United States Patent
Klein et al.

(10) Patent No.: US 7,005,169 B2
(45) Date of Patent: *Feb. 28, 2006

(54) POLYESTER FILM HAVING IMPROVED OXYGEN BARRIER, COMPRISING POLY(M-XYLENEADIPAMIDE) AND ALSO AN OVERLAYER AND A BARRIER COATING, PROCESS FOR ITS PRODUCTION AND ITS USE

(75) Inventors: Oliver Klein, Mainz (DE); Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 68 days.

This patent is subject to a terminal disclaimer.

(21) Appl. No.: 10/760,986

(22) Filed: Jan. 20, 2004

(65) Prior Publication Data

US 2004/0146750 A1    Jul. 29, 2004

(30) Foreign Application Priority Data

Jan. 21, 2003   (DE) .............................. 103 02 035

(51) Int. Cl.
- B32B 27/08  (2006.01)
- B32B 27/30  (2006.01)
- B32B 27/34  (2006.01)
- B32B 27/36  (2006.01)
- B32B 31/30  (2006.01)

(52) U.S. Cl. ............. 428/36.6; 428/141; 428/474.4; 428/475.2; 428/475.5; 428/475.8; 428/476.3; 428/480; 428/483; 428/910; 525/56; 525/57; 525/60; 525/221; 264/288.4; 264/289.3; 264/290.2; 264/289.6; 427/384; 427/385.5; 427/393.5

(58) Field of Classification Search .............. None
See application file for complete search history.

(56) References Cited

U.S. PATENT DOCUMENTS

| | | | | |
|---|---|---|---|---|
| 3,154,461 A | | 10/1964 | Johnson ................. 161/116 |
| 5,021,515 A | * | 6/1991 | Cochran et al. ........... 525/371 |
| 5,552,479 A | * | 9/1996 | Tanaka et al. ............. 525/57 |
| 5,560,988 A | * | 10/1996 | Oba et al. ................. 428/389 |
| 5,574,096 A | * | 11/1996 | Tanaka et al. ............. 525/57 |
| 5,658,676 A | * | 8/1997 | Prissette et al. .......... 428/483 |

(Continued)

FOREIGN PATENT DOCUMENTS

DE    2 353 347    10/1972

(Continued)

OTHER PUBLICATIONS

Schimtz, Peter et al., "Films." Ullmann's Encyclopedia of Industrial Chemistry, 5th Ed., vol. A11 (1988), pp. 85-95, 108-110.*

Primary Examiner—Vivian Chen
(74) Attorney, Agent, or Firm—ProPat, L.L.C.

(57) ABSTRACT

Biaxially oriented polyester films which have a polyester-containing base layer (B) which additionally comprises poly(m-xyleneadipamide) and has been provided on at least one side with an overlayer (A) which has been coated with a barrier layer (D), said barrier layer comprising polyvinyl alcohol and a copolymer of maleic acid and acrylic acid, feature improved optical properties such as high gloss and low opacity and very good barrier properties, in particular toward the passage of oxygen, and, as a consequence of their insensitivity toward moisture, are suitable as a packaging material for foods or other consumable items.

18 Claims, 1 Drawing Sheet

U.S. PATENT DOCUMENTS

| | | | |
|---|---|---|---|
| 5,716,715 A * | 2/1998 | Degrassi et al. | 428/475.8 |
| 5,773,092 A * | 6/1998 | Prissette et al. | 427/385.5 |
| 6,177,159 B1 * | 1/2001 | Tajiri et al. | 428/35.7 |
| 6,288,161 B1 * | 9/2001 | Kim et al. | 524/538 |
| 6,506,463 B1 * | 1/2003 | Cahill et al. | 428/35.7 |
| 6,509,436 B1 * | 1/2003 | Cahill et al. | 528/277 |
| 6,562,276 B1 * | 5/2003 | Shelby et al. | 264/328.8 |
| 6,709,735 B1 * | 3/2004 | Posey et al. | 428/215 |
| 2002/0164442 A1 * | 11/2002 | Hirota et al. | 428/35.7 |
| 2003/0039779 A1 * | 2/2003 | Share et al. | 428/35.7 |
| 2003/0124365 A1 * | 7/2003 | Posey et al. | 428/480 |
| 2004/0146718 A1 * | 7/2004 | Konrad et al. | 428/424.4 |
| 2004/0146725 A1 * | 7/2004 | Konrad et al. | 428/475.2 |
| 2004/0146727 A1 * | 7/2004 | Klein et al. | 428/480 |
| 2004/0146750 A1 * | 7/2004 | Klein et al. | 428/694 SG |

FOREIGN PATENT DOCUMENTS

| | | |
|---|---|---|
| EP | 0 053 498 A2 | 6/1982 |
| EP | 0 347 646 A2 | 12/1989 |
| EP | 0 602 964 A1 | 6/1994 |
| EP | 0 675 158 B1 | 10/1995 |
| EP | 1 197 328 A2 | 8/2002 |
| EP | 1 234 848 A1 | 8/2002 |
| JP | XP002276539 A | 11/1983 |
| JP | XP002276645 A | 3/1994 |
| JP | 2001-347592 | 12/2001 |
| JP | 2001-347592 A | 12/2001 |
| WO | WO 99/62694 A1 | 12/1999 |
| WO | WO 01/92011 A1 | 12/2001 |
| WO | WO 02/38673 A2 | 5/2002 |
| WO | WO 03/041955 * | 5/2003 |

* cited by examiner

POLYESTER FILM HAVING IMPROVED OXYGEN BARRIER, COMPRISING POLY(M-XYLENEADIPAMIDE) AND ALSO AN OVERLAYER AND A BARRIER COATING, PROCESS FOR ITS PRODUCTION AND ITS USE

FIELD OF THE INVENTION

The invention relates to a multilayer, transparent, biaxially oriented polyester film which has a base layer (B) and, applied to this base layer (B), at least one overlayer (A). At least the base layer (B) comprises, as an additional polymer in addition to polyester, poly(m-xyleneadipamide) (MXD6). The overlayer (A) has been coated with a barrier layer (D) which consists of a blend which comprises polyvinyl alcohol and a copolymer of maleic acid and acrylic acid. The invention further relates to a process for producing the film and to its use.

BACKGROUND OF THE INVENTION

Transparent, biaxially oriented polyester films which feature improved barrier properties are disclosed by the prior art. In most cases, the films obtain their improved barrier properties offline after the production by a further processing step. Examples thereof are extrusion coating, coating or lamination with barrier materials, coating under reduced pressure with metals or with ceramic substances, or plasma polymerization in conjunction with vacuum coating.

An exception is the process described in detail in WO 99/62694, in which a multilayer, coextruded polyester film which comprises at least one layer of EVOH (ethylene-vinyl alcohol) is simultaneously biaxially stretched. The film features good mechanical properties, but in particular good barrier properties against the passage of oxygen. The best value reported in the document for the achievable oxygen transmission rate (OTR) is 5 $cm^3/(m^2 \cdot bar \cdot d)$. A disadvantage of the process is that regrind obtained in the course of production cannot be fed back to the process without the film losing its good optical properties.

A further exception is the biaxially oriented film which is described in JP 2001-347592 and consists of a mixture of polyethylene terephthalate and poly(m-xyleneadipamide) (MXD6). The proportion of poly(m-xyleneadipamide) (MXD6) in the film is between 10 and 40% by weight, and the corresponding proportion of polyethylene terephthalate is between 60 and 90% by weight. The film is simultaneously biaxially stretched. It features good mechanical properties, high thermal stability, but in particular a good barrier with respect to the permeation of oxygen. The film achieves an OTR which is less than 30 $cm^3/(m^2 \cdot bar \cdot d)$. In addition, the film features low opacity. The document reports a value for the opacity which is below 15%. A disadvantage of the film is its two rough surfaces which result from the mixing incompatibility of the two raw materials (polyethylene terephthalate and poly(m-xyleneadipamide) (MXD6)). The high roughness values result in the film losing its originally high gloss and obtaining a matt appearance which is undesired for many applications in the packaging industry. A further disadvantage of the film is that it cannot be printed, metalized or coated as efficiently as films which consist, for example, only of polyethylene terephthalate. As a result of the high roughness of the two film surfaces, the thickness distribution of additionally applied layers (printing inks, metals, varnish, ceramic materials) is inadequate. This likewise worsens the physical properties of these layers.

Likewise an exception is the film of EP-B-0 675 158 which is an oriented composite film based on polyester and having improved barrier properties toward gases. The film is coated on at least one of the two sides with a layer, having a thickness of 0.3 µm or less, of polyvinyl alcohol which has a number-average degree of polymerization of 350 and more, and the average roughness $R_z$ of the side of the base film to be coated is 0.30 µm or less, and this side features a certain distribution of elevations on the film surface. The composite film has an OTR which is less than 3 $cm^3/(m^2 \cdot bar \cdot d)$. A disadvantage of this composite film is its low resistance, for example, toward moisture. On contact with water or steam, the adhesion of the barrier coating of polyvinyl alcohol to the polyester film is lost, with the effect that the barrier coating can be washed off the polyester film.

SUMMARY OF THE INVENTION

It is an object of the present invention to provide a biaxially oriented polyester film which features very good barrier properties, in particular toward the passage of oxygen. It should no longer have the disadvantages of the prior art films and have in particular the following features:

- at least one of the two film surfaces has roughness values which are so low that the film has, for example, good printability, good metalizability or good coatability, without this additional functional layer impairing their effectiveness;
- at least one of the two film surfaces has such high gloss that the film can be used for application in packaging without significant restriction;
- the film can be produced economically, also meaning, for example, that the film can be produced using (generally sequential) stretching processes which are customary in industry, without being restricted to the expensive simultaneous stretching process;
- good adhesion is ensured between the individual layers of the film for their practical applicability, even after contact of the film with moisture; in particular, the barrier properties should not be severely worsened by the contact with moisture;
- it is guaranteed in the course of the production of the film that the regrind can be fed back to the extrusion in an amount of up to 60% by weight, without the physical and optical properties of the film, but in particular the barrier toward oxygen, being significantly adversely affected.

On the other hand, the other properties which are features of polyester films should at the same time not worsen. These include, for example, the mechanical and the thermal properties, the winding behavior and the processibility of the film, in particular in printing, laminating or coating with metallic or ceramic materials.

DETAILED DESCRIPTION OF THE INVENTION

The object is achieved by a biaxially oriented polyester film which has a base layer (B) and has, applied to this base layer (B), at least one overlayer (A) which has been coated with a barrier layer (D), wherein the base layer (B) comprises poly(m-xyleneadipamide) (MXD6), and the barrier layer (D) is composed of a blend in which a film-forming substance and a copolymer of maleic acid and acrylic acid are present.

The base layer (B) also comprises thermoplastic polyester, preferably at least 60% by weight thereof based on the weight of the layer (B). The proportion of poly(m-xyleneadipamide) in the base layer is preferably from 5 to 40% by weight, based on the weight of the layer (B). The film-forming substance is preferably polyvinyl alcohol.

Poly(m-xyleneadipamide) (MXD6), also referred to as poly-m-xylylenediamine or PA-MXD6, is a polycondensation product (polyarylamide) of m-xylylenediamine and adipic acid and is offered on the market in various types which are in principle all suitable for the inventive purpose. Preference is given to types having a melt viscosity of smaller than 2000 poises.

The multilayer, biaxially oriented, transparent polyester film of the present invention, compared to prior art films, has improved optical properties, in particular increased gloss (at least on one film surface). In addition, the film features outstanding barrier properties, in particular toward the passage of oxygen. A minimum adhesion between the particular layers of the film of greater than 0.5 N/25 mm is ensured, even after contact with moisture. This also applies to the adhesion between the layers (A) and (D).

The film has an OTR of preferably less than 25 cm$^3$/(m$^2$·d·bar), preferably less than 20 cm$^3$/(m$^2$·d·bar) and more preferably less than 15 cm$^3$/(m$^2$·d·bar).

Figure 1:
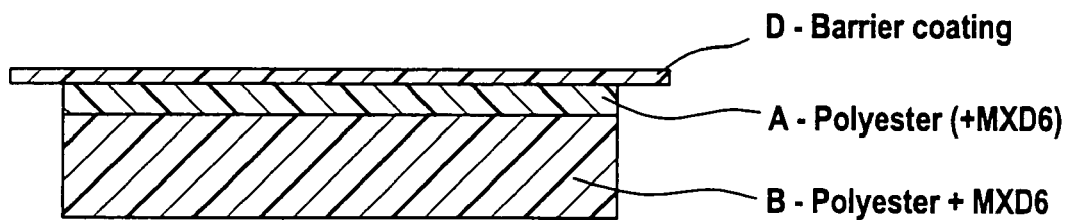
FIG. 1 is a cross-sectional schematic illustration of exemplary embodiments of films in accordance with the invention.
Figure 2:
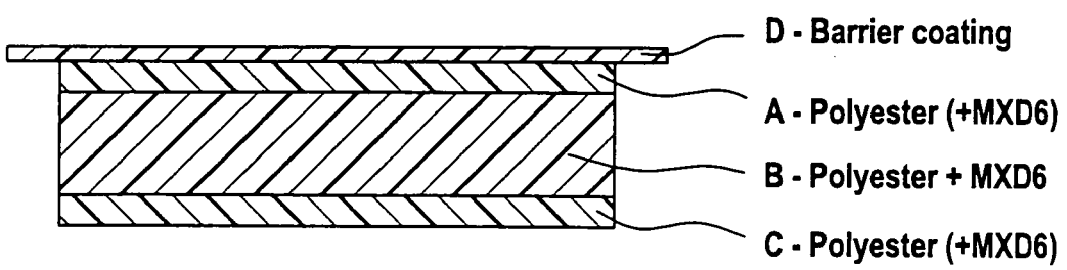
FIG. 2 is a cross-sectional schematic illustration of further exemplary embodiments of films in accordance with the invention.

The film of the present invention consists of at least the inventive base layer (B), the inventive overlayer (A) and the inventive coating (D). In this case, the film has a three-layer structure (cf. FIG. 1). In a preferred embodiment, the film has a four-layer or multilayer structure (cf. FIG. 2). In that case, it consists of the inventive base layer (B), the two inventive overlayers (A) and (C) and the inventive coating (D), and also optionally further intermediate layers (E, F, ...). The overlayers (A) and (C) may be the same or different and the layer (C) may also be provided, for example, with a coating (D).

The base layer of the film preferably consists of at least 60% by weight of thermoplastic polyester (=component I). Suitable for this purpose are, for example, polyesters of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclohexane and terephthalic acid (=poly-1,4-cyclohexanedimethylene terephthalate, PCDT), and also of ethylene glycol, naphthalene 2,6-dicarboxylic acid and biphenyl 4,4'-dicarboxylic acid (=polyethylene 2,6-naphthalate bibenzoate, PENBB). Preference is given to polyesters which consists of at least 90 mol %, more preferably at least 95 mol %, of ethylene glycol and terephthalic acid units or of ethylene glycol and naphthalene 2,6-dicarboxylic acid units. The remaining monomer units stem from other diols or other dicarboxylic acids. Advantageously, copolymers or mixtures or blends of the homo- and/or copolymers mentioned may also be used for component I of the base layer (B).

It is particularly advantageous for the last-mentioned case when component I which is used in the base layer (B) is a polyester copolymer based on isophthalic acid and terephthalic acid or based on terephthalic acid and naphthalene 2,6-dicarboxylic acid. In this case, the producibility of the film is good and the optical properties of the film and also the barrier properties of the film which are achieved are particularly good.

In this case, the base layer (B) comprises substantially, as component I, a polyester copolymer which is composed predominantly of isophthalic acid and terephthalic acid units and/or terephthalic acid and naphthalene 2,6-dicarboxylic acid units and of ethylene glycol units, and, as component II, the aforementioned poly(m-xyleneadipamide) (MXD6) according to the invention.

The preferred copolyesters which provide the desired properties of the film (in particular the optical properties, common stretchability) are those which are composed of terephthalate and isophthalate units and of ethylene glycol units. The proportion of ethylene terephthalate in these copolymers is preferably from 40 to 97 mol % and the corresponding proportion of ethylene isophthalate is from 60 to 3 mol %. Preference is given to copolyesters in which the proportion of ethylene terephthalate is from 50 to 95 mol % and the corresponding proportion of ethylene isophthalate is from 50 to 5 mol %, and greater preference is given to copolyesters in which the proportion of ethylene terephthalate is from 60 to 90 mol % and the corresponding proportion of ethylene isophthalate is from 40 to 10 mol %.

Suitable other aliphatic diols which may be constituents of the polyesters according to the invention are, for example, diethylene glycol, triethylene glycol, aliphatic glycols of the general formula HO—(CH$_2$)$_n$—OH where n is an integer from 2 to 6 (in particular propane-1,3-diol, butane-1,4-diol, pentane-1,5-diol and hexane-1,6-diol) or branched aliphatic glycols having up to 6 carbon atoms, or cycloaliphatic, optionally heteroatom-containing diols having one or more rings. Of the cycloaliphatic diols, mention should be made of cyclohexanediols (in particular cyclohexane-1,4-diol). Suitable other aromatic diols correspond, for example, to the formula HO—C$_6$H$_4$—X—C$_6$H$_4$—OH where X is —CH$_2$—, —C(CH$_3$)$_2$—, —C(CF$_3$)$_2$—, —O—, —S— or —SO$_2$—. In addition, bisphenols of the formula HO—C$_6$H$_4$—C$_6$H$_4$—OH are also very suitable.

Suitable other aromatic dicarboxylic acids which may be constituents of the polyesters according to the invention are preferably benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the (C$_3$–C$_{19}$)alkanedioic acids are particularly suitable, and the alkane moiety may be straight-chain or branched.

The polyesters may be prepared by the known transesterification process. This starts from dicarboxylic esters and diols which are reacted with the customary transesterification catalysts such as zinc salts, calcium salts, lithium salts and manganese salts. The intermediates are then polycondensed in the presence of generally customary polycondensation catalysts such as antimony trioxide or titanium salts. The preparation may be effected equally efficiently by the direct esterification process in the presence of polycondensation catalysts. This starts directly from the dicarboxylic acids and the diols.

According to the invention, a further component contained in the base layer (B) is poly(m-xyleneadipamide) (MXD6) (=component II) in an amount of preferably from 5 to 40% by weight, in particular in an amount of from 6 to 35% by weight and more preferably in an amount of from 7 to 30% by weight, based on the weight of the base layer (B).

For the processing of the polymers, it has been found to be favorable when the poly(m-xyleneadipamide) (MXD6) is selected in such a way that there is not too great a difference in the viscosities of the particular polymer melts. Otherwise, additional elevations/projections, disruptions to flow or streak formation on the finished film are to be expected under some circumstances. In addition, the polymers then tend to separate. In accordance with the experiments carried out here, the melt viscosity of the poly(m-xyleneadipamide) (MXD6) should preferably be below certain values. Very good results are obtained in the context of the present invention when the melt viscosity for the MXD6 is less than 2000 poises (measured in a capillary rheometer of diameter 0.1 mm, length 10 mm and load 10 kg/cm$^2$, melt temperature 280° C.), preferably less than 1800 poises and more preferably less than 1600 poises.

The same also applies to the viscosity of the polyester used. Very good results are obtained in the context of the present invention when the melt viscosity for the polyester is less than 2000 poises (measured in a capillary rheometer of diameter 0.1 mm, length 10 mm and load 10 kg/cm$^2$, melt temperature 280° C.), preferably less than 1800 poises and more preferably less than 1600 poises.

According to the invention, to achieve good melt homogeneity and to achieve good stretchability, the viscosities of the starting polymers should not differ by more than 30% (viewed in absolute terms), based on the melt viscosity of the polyester used.

The poly(m-xyleneadipamide) (MXD6) is appropriately incorporated into the film either as pure granules or as a granulated concentrate (masterbatch). To this end, the polyester granules are premixed with the poly(m-xyleneadipamide) (MXD6) or the poly(m-xyleneadipamide) (MXD6) masterbatch and subsequently fed to the extruder. In the extruder, the components are mixed further and heated to processing temperature. It is appropriate for the process according to the invention that the extrusion temperature is above the melt temperature $T_s$ of the poly(m-xyleneadipamide) (MXD6), generally at least 5° C., preferably from 10 to 50° C., but in particular from 20 to 40° C., above the melt temperature of the poly(m-xyleneadipamide) (MXD6). A preferred extrusion unit for the processing of the mixture or for the production of the masterbatch from components I and II is the twin-screw extruder.

The film of the present invention has an at least three-layer structure. In that case, it consists of the inventive base layer (B), the inventive overlayer (A) disposed thereon and the inventive barrier coating (D) disposed on the overlayer (A). In addition, the film may comprise additional layers which are referred to as overlayers or as intermediate layers. Typical film structures are then, for example, ABAD, DABC, DABD or DABCD, where A and C are appropriate overlayers. The overlayers (A) and (C) or else the layers (D) may have the same or different compositions.

For the overlayers and any intermediate layers, the same (polyester) polymers may in principle be used as for the base layer B. In addition, other materials may also be present in these layers, in which case they preferably consist of a mixture of polymers, copolymers or homopolymers which contains ethylene isophthalate units and/or ethylene 2,6-naphthalate units and/or ethylene terephthalate units. Up to 10 mol % of the polymers may consist of further comonomers.

Advantageously, further components which may be used in these further layers are also (polyester) copolymers or (polyester) mixtures or blends of homo- and/or copolymers.

It is particularly appropriate when a polyester copolymer based on isophthalic acid and terephthalic acid is used in the overlayers. In this case, the optical properties of the film are particularly good.

In this case, the overlayers of the film comprise substantially a polyester copolymer which is composed predominantly of isophthalic acid and terephthalic acid units and of ethylene glycol units. The remaining monomer units stem from other aliphatic, cycloaliphatic of aromatic diols or other dicarboxylic acids as may also occur in the base layer. The preferred copolyesters which provide the desired properties of the film (in particular the optical properties) are those which are composed of terephthalate and isophthalate units and of ethylene glycol units. The proportion of ethylene terephthalate is preferably from 40 to 97 mol % and the corresponding proportion of ethylene isophthalate is from 60 to 3 mol %. Preference is given to copolyesters in which the proportion of ethylene terephthalate is from 50 to 90 mol % and the corresponding proportion of ethylene isophthalate is from 50 to 10 mol %, and greater preference is given to copolyesters in which the proportion of ethylene terephthalate is from 60 to 85 mol % and the corresponding proportion of ethylene isophthalate is from 40 to 15 mol %.

In a further embodiment, a further component also contained in the overlayer (A) and optionally also in the overlayer (C) is poly(m-xyleneadipamide) (MXD6) (=component II) in an amount of preferably from 0 to 50% by weight, in particular in an amount of from 2 to 40% by weight and more preferably in an amount of from 4 to 30% by weight, based on the weight of the particular overlayer. In a preferred embodiment of the invention, the base layer (B) comprises a higher proportion of poly(m-xyleneadipamide) (MXD6) than the overlayer (A) or (C).

The thickness of the overlayers is preferably greater than 1.0 μm and is preferably in the range from 1.5 to 20 μm and more preferably in the range from 2.0 to 10 μm.

The base layer (B), the overlayers and any intermediate layers present may additionally comprise customary additives, for example stabilizers and antiblocking agents. They are appropriately added to the polymer or to the polymer mixture before the melting. Stabilizers used are, for example, phosphorus compounds such as phosphoric acid or phosphoric esters. Typical antiblocking agents (also referred to in this context as pigments or fillers) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, LiF, calcium, barium, zinc or manganese salts of the dicarboxylic acids used, carbon black, titanium dioxide, kaolin or crosslinked polystyrene or acrylate particles.

The additives selected may also be mixtures of two or more different antiblocking agents or mixtures of antiblocking agents of the same composition but different particle size. The particles may be added to the individual layers in the customary concentrations, for example as a glycolic dispersion during the polycondensation or via masterbatches in the extrusion. It has been found that advantageous pigment concentrations are from 0.0001 to 5% by weight, based on the weight of the layer provided with them. A detailed description of the antiblocking agents can be found, for example, in EP-A-0 602 964.

In a preferred embodiment of the invention, the filler content in the overlayer (A) is less than 0.5% by weight, preferably less than 0.4% by weight and more preferably less than 0.3% by weight, based on the weight of the overlayer (A).

In another preferred embodiment, the film has a four-layer structure and in that case comprises the base layer (B), the two overlayers (A) and (C) and the barrier coating (D). The further overlayer (C) may have the same composition as the overlayer (A).

In a further, particularly preferred embodiment, the overlayer (A) comprises no poly(m-xyleneadipamide) (MXD6), and in addition not more than 0.5% by weight of a certain filler, for example $SiO_2$, and has an average roughness $R_a$ which is in the range from 10 to 100 nm. It is advantageous when the average diameter $d_{50}$ of the fillers used is within the range from preferably 2.0 to 5.0 μm.

Such an overlayer (A) is then very particularly suitable for the application of the inventive barrier layer (D) which may be applied, for example, inline (in the production of the film) by suitable processes (for example reverse gravure).

In this particularly preferred embodiment, it may be found to be appropriate to add the additional component II (poly (m-xyleneadipamide) (MXD6)) to the further overlayer (C).

According to the invention, the overlayer (A) is coated with a barrier layer (D) which consists of a blend which comprises a film-forming substance, preferably polyvinyl alcohol, and a copolymer of maleic acid and acrylic acid. The preferred poly(maleic acid-co-acrylic acid) copolymer (PMA-co-PA) has an average molecular weight of from 1500 to 15 000, contains the individual monomer units in a ratio of about 50:50 and has an alternating structure. Conventional block copolymers are not preferred. The solids content of the copolymer according to the invention in the coating is preferably from 50 to 95% by weight, in particular from 55 to 90% by weight and more preferably from 60 to 85% by weight, based on the sum of copolymer and film-forming substance.

In addition to the copolymer, the blend of the coating according to the invention comprises a film-forming substance which is preferably water-soluble. This substance essentially minimizes the brittleness of the coating. A preferred film-forming substance is polyvinyl alcohol. The solids content of the polyvinyl alcohol or of the film-forming substance in the coating is preferably from 5 to 50% by weight, in particular from 10 to 45% by weight and more preferably from 15 to 40% by weight, based on the sum of copolymer and film-forming substance. The molecular weight of the polyvinyl alcohol is preferably greater than 15 000, in particular greater than 20 000 and more preferably greater than 30 000.

In a preferred embodiment, the coating or the blend also comprises a wetting agent and/or a starch, and the latter should preferably be water-soluble. In addition, antimicrobiological substances, for example triclosan or methylparaben, may be added to the coating or to the blend.

A preferred coating batch (=solution or dispersion of the inventive blend and water) comprises from 2 to 3% by weight of polyvinyl alcohol and from 7 to 8% by weight of poly(maleic acid-co-acrylic acid) copolymer. The proportion of water in this solution is from 50 to 99% by weight, preferably from 80 to 95% by weight. % by weight are based here in each case on the finished dispersion/solution.

For the dispersion or for the dissolution of the solids according to the invention (blend comprising any further additives), preference is given to using water or water-containing solvents. Alternatively, the solvents used may also be alcohols or other suitable organic substances, alone or in combination with water. The solids content in the finished solution/dispersion is generally up to 50% by weight, preferably from 0.01 to 30% by weight and more preferably from 5 to 15% by weight.

A film which has been coated with the inventive barrier layer is outstandingly suitable for the packaging of foods, in which case contact of the coating with the food is also possible. The coated film has excellent resistance to solvents and also to water. It has been found, for example, that a two-hour extraction of the film coated in accordance with the invention in a 121° C. steam atmosphere extracted no measurable amounts of the coating.

Another significant advantage of the coating according to the invention is its ability to provide good barrier properties even at low layer thicknesses. One consequence is a reduction in the costs and another is that this improves the transparency of the film. In general, the coating thickness (D) is from 0.01 to 1 μm, preferably from 0.04 to 0.2 μm and more preferably from 0.06 to 0.15 μm.

The total thickness of the polyester film according to the invention may vary within wide limits and depends upon the intended application. It is generally from 6 to 300 μm, preferably from 8 to 200 μm, more preferably from 10 to 100 μm, and the base layer (B) has a proportion of preferably from 40 to 99% of the total thickness.

The present invention also provides a process for producing the film. To produce the base layer (B), the particular components (component I=polyester homo- or polyester copolymer or mixtures thereof, component II=poly(m-xyleneadipamide) (MXD6) granules) are appropriately fed directly to the extruder. The materials can be extruded at from about 270 to 300° C. From a process technology point of view (mixing of the different polymers), it has been found to be particularly favorable when the extrusion of the polymers for the base layer (B) is carried out on a twin-screw extruder having degassing means.

The polymers for the overlayers are appropriately fed to the (coextrusion) system via a further extruder; preference is to be given in principle here also to the twin-screw extruder over the single-screw extruder. The melts are shaped in a multilayer nozzle to give flat melt films and layered one on top of the other. Subsequently, the multilayer film is drawn off and solidified with the aid of a chill roll and optionally further rolls.

The biaxial stretching is generally carried out sequentially. Stretching is preferably effected first in longitudinal direction (i.e. in machine direction) and subsequently in transverse direction (i.e. at right angles to machine direction). The stretching in longitudinal direction can be carried out with the aid of two rolls rotating at different rates in accordance with the desired stretching ratio. For transverse stretching, an appropriate tenter frame is generally used.

The temperature at which the stretching is carried out may vary within a relatively wide range and depends upon the desired properties of the film. In general, the stretching in longitudinal direction is carried out within a temperature range of from 80 (heating temperatures from 80 to 130° C.) to 130° C. (stretching temperatures 80–130° C., depending on the stretching ratio) and the transverse stretching within a temperature range of from 90 (beginning of the stretching) to 140° C. (end of the stretching). The longitudinal stretching ratio is preferably in the range from 2.0:1 to 5.0:1, in particular from 2.3:1 to 4.8:1. The transverse stretching ratio is preferably in the range from 2.5:1 to 5.0:1, in particular from 2.7:1 to 4.5:1.

Before the transverse stretching, at least the surface of the overlayer (A) of the film is coated, preferably inline, with the barrier coating (D) according to the invention.

For the production of a film having very particularly good optical properties (=very low opacity) and having good process reliability (=few tears), it has been found to be favorable when the planar orientation Δp of the film is less than Δp=0.160, preferably less than Δp=0.158 and very preferably less than Δp=0.156. The process parameters in the longitudinal stretching and in the transverse stretching have a significant influence on the planar orientation Δp of the finished film. The most important process parameters influencing the planar orientation include the stretching ratios in longitudinal and in transverse direction ($\lambda_{MD}$ and $\lambda_{TD}$) and the stretching temperatures in longitudinal and in transverse direction ($T_{MD}$ and $T_{TD}$). For example, when a machine is used to obtain a planar orientation of the film produced of Δp=0.165 with the parameter set $\lambda_{MD}$=4.6 and $\lambda_{TD}$=4.0 and $T_{MD}$=118° C. and $T_{TD}$=125° C., increasing the longitudinal stretching temperature to $T_{MD}$=125° C. or increasing the transverse stretching temperature to $T_{TD}$=135° C. or reducing the longitudinal stretching ratio to $\lambda_{MD}$=4.3 or reducing the transverse stretching ratio to $\lambda_{TD}$=3.7 results in a planar orientation Δp being obtained which is within the preferred range. The temperatures specified relate, in the longitudinal stretching, to the particular roll temperatures, and, in the transverse stretching, to the film temperatures which were measured by means of IR.

In the subsequent heat-setting, the film is kept at a temperature of from approx. 150 to 250° C. over a period of from about 0.1 to 10 s. Subsequently, the film is wound up in the customary manner.

The gloss of the film surface (A) is preferably greater than 100, at an angle of incidence of 20°. In a preferred embodiment, the gloss of this side is more than 110 and in a particularly preferred embodiment more than 120. This film surface is therefore especially suitable for further functional coatings, in the present case for the coating with the barrier layer (D) according to the invention as was described above. The high gloss of the overlayer (A) (in a first approximation equivalent to high gloss of the overlayer (A)) only slightly disrupts the functional layer, if at all. For example, a uniform thickness distribution of the coating (D) is achieved, which allows particularly good physical properties of this layer to ultimately be established.

The opacity of the film is preferably less than 20%. In a preferred embodiment, the opacity of the film is less than 15% and in a particularly preferred embodiment less than 10%. The low opacity makes the film especially suitable for application in packaging.

A further advantage of the invention is that the production costs of the film according to the invention are not significantly above those of a film made of standard polyester raw materials. In addition, when producing the film, it is guaranteed that offcut material which inherently occurs in the course of operation of film production can be reused for the film production as regrind in an amount of up to approx. 60% by weight, preferably from 10 to 50% by weight, based in each case on the total weight of the film, without significantly adversely affecting the physical properties of the film.

In addition, the film according to the invention is outstandingly suitable for metallization or vacuum coating with ceramic substances. Preference is given here to metallizing or to coating with ceramic substances on the side which has been coated with the coating according to the invention. In that case, it has the very particular feature of outstanding barrier properties, not only toward oxygen, but also toward steam.

The film according to the invention is therefore especially suitable for packaging foods or other consumable items. The film features outstanding barrier properties, in particular toward oxygen. In addition, it is resistant toward contact with moisture. In comparison to prior art barrier layers, the barrier layer (D) can, for example, not be washed off.

The table which follows (table 1) once again summarizes the most important inventive and preferred film properties, and "inventive" is to be regarded as a preferred embodiment.

TABLE 1

|  | Inventive | Preferred | More preferred | Unit | Measurement method |
|---|---|---|---|---|---|
| Base layer B |  |  |  |  |  |
| Component I (= thermoplastic polyester) | 60 to 95 | 65 to 94 | 70 to 93 | % by wt. |  |
| Component II (= poly(m-xyleneadipamide) (MXD6) | 5 to 40 | 6 to 35 | 7 to 30 | % by wt. |  |
| Melt viscosity of the poly(m-xyleneadipamide) (MXD6) used | <2000 | <1800 | <1600 | poise | in capillary rheometer, 280° C. |
| Barrier coating (D) |  |  |  |  |  |
| Polyvinyl alcohol (solids content based on PVOH + copolymer) | 5 to 50 | 10 to 45 | 15 to 40 | % by wt. |  |
| Poly(maleic acid-co-acrylic acid) copolymer (solids content based on PVOH + copolymer) | 50 to 95 | 55 to 90 | 60 to 85 | % by wt. |  |
| Thickness of the layer (D) | 0.01 to 1 | 0.04 to 0.2 | 0.06 to 0.15 | μm |  |
| Film properties |  |  |  |  |  |
| Permeation coefficient for oxygen | <25 | <20 | <15 | $cm^3 * [12 \mu m]/(m^2 \cdot bar \cdot d)$ | DIN 53 380, Part 3 |
| OTR of a film of thickness 12 μm | <25 | <20 | <15 | $cm^3/(m^2 \cdot bar \cdot d)$ | DIN 53 380, Part 3 |
| Adhesion between the layers | <0.5 | >1.0 | >1.5 | N/25 mm | as described |
| Planar orientation Δp | <0.160 | <0.158 | <0.156 |  | as described |
| Thickness of the film | 6 to 300 | 8 to 200 | 10 to 100 | μm |  |
| Opacity of the film | <20 | <15 | <10 | % | ASTM-D 1003-52 |

Test Methods

To characterize the raw materials and the films, the following methods were used:

DIN=Deutsches Institut für Normung [German Institute for Standardization]

ASTM=American Society for Testing and Materials

(1) Oxygen Transmission Rate (OTR)

The oxygen barrier was measured using an OXTRAN® 100 from Mocon Modern Controls (USA) in accordance with DIN 53 380, Part 3 (23° C., 50% relative atmospheric humidity on both sides of the film). The OTR was measured in each case on film of thickness 12 μm.

(2) Opacity

The opacity of the film was determined based on ASTM-D 1003-52.

(3) SV Value (Standard Viscosity)

The standard viscosity (SV) (DCA) is measured in dichloroacetic acid, based on DIN 53726. The intrinsic viscosity (IV) is calculated from the standard viscosity as follows $$IV(DCA)=6.907 \cdot 10^{-4} SV(DCA)+0.063096$$

(4) Gloss

The gloss was determined to DIN 67530. The reflector value was measured as a characteristic optical parameter for the surface of a film. Based on the standards ASTM-D 523-78 and ISO 2813, the angle of incidence was set to 20° or 60°. A light beam hits the flat test surface at the angle of incidence set and is reflected or scattered by it. The light beams incident on the photoelectronic detector are displayed as a proportional electrical quantity. The measurement is dimensionless and has to be quoted together with the angle of incidence. The measurements of the gloss which are specified in the examples were measured at an angle of incidence of 20°.

(5) Roughness

The roughness $R_a$ of the film was determined to DIN 4768 at a cutoff of 0.25 mm. Measurement was effected not on a glass plate, but rather in a ring. In the ring method, the film is clamped into a ring, so that neither of the two surfaces touches a third surface (for example glass).

(6) Planar Orientation Δp

The planar orientation is determined via the measurement of the refractive index using an Abbe refractometer (Kruss Optronic, Germany). The planar orientation is always measured on the glossier side of the film. The determination of the refractive index has already been reproduced in detail, for example, in EP-A-0 952 176, page 10. Reference is therefore made here explicitly to this document. The orientation values are then calculated from the refractive indices by the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

(7) Adhesion Between the Layers

Before adhesive bonding, the film specimen (300 mm long·180 mm wide) of the present invention is placed on smooth card (200 mm long·180 mm wide; approx. 400 g/m², bleached, outer layers coated), the projecting film ends are folded back onto the reverse side and secured with adhesive tape.

The film of the present invention is adhesively bonded with a standard polyester film of thickness 12 μm (for example Melinex® 800) with a doctor unit and doctor bar no. 3 from Erichsen (Germany), by applying approx. 1.5 ml of adhesive (Novacote® NC 275+CA 12; mixing ratio: 4/1+7 parts of ethyl acetate) to the barrier layer (D) of the film of the present invention. After the solvent has been removed by aeration, the standard polyester film is laminated to the barrier layer (D) of the film of the present invention using a metal roller (width 200 mm, diameter 90 mm, mass 10 kg, to DIN EN 20 535). The parameters of lamination are:

| | |
|---|---|
| Amount of adhesive: | 5 +/− 1 g/m² |
| Aeration after application of the adhesive: | 4 min +/− 15 s |
| Doctor thickness (Erichsen): | 3 |
| Speed level of the doctor: | approx. 133 mm/s |
| Curing time of the bond: | 2 h at 70° C. in a forced-air oven |

A 25+/−1 mm strip cutter is used to take samples of length approx. 100 mm. Approx. 50 mm of composite and 50 mm of unbonded separate layers are required here to secure/clamp the test specimen. The test specimens are secured by the reverse side of the film of the present invention (base layer B or overlayer C) over the full surface to a support plate by means of double-sided adhesive tape. The plate with the composite adhesively bonded thereto is clamped into the lower clamping jaw of the tensile testing machine. The clamp separation is 100 mm. The unlaminated end of the standard polyester film is clamped into the upper clamping jaw of the tensile testing machine (for example Instron®, Zwick) in such a way that there is a peel angle of 180°. The average peel force in N/25 mm is reported, rounded to one decimal place.

| | |
|---|---|
| Sample width | 25 mm |
| Initial force: | 0.1 N |
| Measurement length: | 25 mm |
| Separation rate up to initial force: | 25 mm/min |
| Starting distance: | 5 mm |
| Test distance: | 40 mm |
| Sensitivity: | 0.01 N |
| Separation rate: | 100 mm/min |

The measurement for the peel force is equivalent to the minimum adhesive force between the layers of the inventive film, since the adhesive force between the adhesive and the standard film is distinctly greater.

EXAMPLES

The examples which follow illustrate the invention. The products used (brands and manufacturer) are each specified only once and then also relate to the examples which follow.

Example 1

Chips of polyethylene terephthalate (prepared by the transesterification process using Mn as the transesterification catalyst, Mn concentration in the polymer: 100 ppm;

dried to a residual moisture content of below 100 ppm at a temperature of 150° C.) and poly(m-xyleneadipamide) (MXD6), likewise dried at a temperature of 150° C., were fed in a mixing ratio of 85:15 to the extruder (single-screw extruder) for the base layer (B). Chips of polyethylene terephthalate and particular fillers were likewise fed to the extruder for the overlayer (A). Coextrusion was then used to initially produce a two-layer film having AB structure. The film was stretched in longitudinal direction and then coated with the inventive barrier layer (D) (by means of reverse gravure). Subsequently, the three-layer film was stretched in transverse direction to obtain a transparent, three-layer film having DAB structure and a total thickness of 12 µm. The thickness of the overlayer (A) was 2.0 µm.

| Barrier coating (D) applied to overlayer (A): | |
|---|---|
| 7% by weight | of PMA-co-PA having an average molecular weight of 3000 from Sigma-Aldrich, Milwaukee, Wisconsin, USA (product name: 41605-3) |
| 3% by weight | of polyvinyl alcohol from Celanese Ltd., USA (product name: CELVOL ® 305, $M_w$ = 31 000 to 50 000) |
| Overlayer (A): | |
| 100% by weight | of polyester raw material 4023 from KoSa, Germany, having an SV value of 800, consisting of 99.9% by weight of polyethylene terephthalate and 0.1% by weight of silica particles (SYLYSIA ® 320 from Fuji/Japan) having a $d_{50}$ value of 2.5 µm |
| Base layer (B): | |
| 85.0% by weight | of polyethylene terephthalate 4023 from KoSa having an SV value of 800 |
| 15% by weight | of poly(m-xyleneadipamide) (MXD6) from Mitsubishi Gas Chemical Co., product name NYLON ® MXD6 6001, having a melt viscosity of 1400 poises |

The production conditions in the individual process steps were:

| Extrusion | Temperatures A layer: | 290° C. |
|---|---|---|
| | B layer: | 290° C. |
| | Temperature of the takeoff roll | 25° C. |
| Longitudinal stretching: | Stretching temperature: | 125° C. |
| | Longitudinal stretching ratio: | 4 |
| Transverse stretching: | Stretching temperature: | 130° C. |
| | Transverse stretching ratio | 3.9 |
| Setting: | Temperature: | 230° C. |
| | Time: | 3 s |

The surface of the overlayer (A) had the required high gloss, and the film had the required low opacity and the required low OTR. In addition, the film could be produced very efficiently, i.e. without tears, and also exhibited the desired processing performance.

Example 2

In comparison to example 1, coextrusion is now used to produce an initially three-layer film having ABC structure. The two layers (A) and (B) were not changed in comparison to example 1. In addition, chips of polyethylene terephthalate and a filler were fed to the extruder (twin-screw extruder) for the overlayer (C). The film was stretched in longitudinal direction and then coated with the inventive barrier layer (D) (by means of reverse gravure). Subsequently, the four-layer film was stretched in transverse direction to obtain a transparent, four-layer film having DABC structure and a total thickness of 12 µm. The thickness of the overlayers (A) and (C) was in each case 2.0 µm.

| Overlayer (C): | |
|---|---|
| 100% by weight | of polyester raw material 4023 from KoSa having an SV value of 800, consisting of 99% by weight of polyethylene terephthalate 4023 from KoSa and 1.0% by weight of silica particles (SYLYSIA ® 320 from Fuji/Japan) having a $d_{50}$ value of 2.5 µm |

The production conditions in the individual process steps were similar to those in example 1. The surface of the overlayer (A) had the required high gloss, and the film had the required low opacity and the required low OTR. In addition, the film could be produced very efficiently, i.e. without tears, and also exhibited the desired processing performance.

Comparative Example CE1

A film was produced in accordance with example 1 of JP 2001-347592. The roughness values of this film are much too high and the gloss of the film is not within the inventive range.

The properties and the structure of the films produced in the examples and the comparative examples are compiled in table 2.

TABLE 2

| Examples | Film thickness µm | Film structure | Thickness of the barrier layer (D) µm | Poly(m-xyleneadipamide) (MXD6) content in base layer (B) % by wt. | Poly(m-xyleneadipamide) (MXD6) content in overlayer (A) % by wt. | Gloss of the surface (A) (20°) | Roughness $R_a$ of the surface (A) µm | Planar orientation Δp | OTR $cm^3$/ $m^2$ · bar · d | Adhesion between the layers A and B N/25 mm | Opacity of the film % |
|---|---|---|---|---|---|---|---|---|---|---|---|
| Example 1 | 12 | DAB | 0.1 | 15 | 0 | 160 | 40 | 0.154 | 13 | 1 | 6 |
| Example 2 | 12 | DABC | 0.1 | 15 | 0 | 170 | 40 | 0.154 | 13 | 1 | 5 |
| CE 1 | 12 | B | | 20 | — | 65 | 170 | | 22 | | 8 |

What is claimed is:

1. A polyester film which has a base layer (B) and has, applied to this base layer (B), at least one overlayer (A) which has been coated with a barrier layer (D), wherein the base layer (B) comprises poly(m-xyleneadipamide) and polyester, and the barrier layer (D) is composed of a blend in which a film-forming substance and a copolymer of maleic acid and acrylic acid are present, wherein said film exhibits an oxygen transmission smaller than 25 $cm^3 \cdot m^{-2} \cdot d^{-1} \cdot bar^{-1}$ and a gloss for overlayer (A) of greater than 100.

2. The polyester film as claimed in claim 1, wherein the base layer (B) comprises from 5 to 40% by weight of poly(m-xyleneadipamide), based on the weight of the base layer (B).

3. The polyester film as claimed in claim 1, wherein the overlayer (A) comprises poly(m-xyleneadipamide).

4. The polyester film as claimed in claim 1, wherein the melt viscosity of the poly(m-xyleneadipamide) is smaller than 2000 poises.

5. The polyester film as claimed in claim 1, wherein the polyester of the base layer (B) has at least one of ethylene glycol units and terephthalic acid units, and ethylene glycol units and naphthalene-2,6-dicarboxylic acid units.

6. The polyester film as claimed in claim 1, wherein the polyester of the base layer (B) has isophthalic acid units, terephthalic acid units, and ethylene glycol units.

7. The polyester film as claimed in claim 1, wherein polyethylene terephthalate is used as polyester of the base layer (B).

8. The polyester film as claimed in claim 1, wherein polyvinyl alcohol is used as film-forming substance for the barrier layer (D).

9. The polyester film as claimed in claim 1, which has a D-A-B-C layer structure, A and C being overlayers which may be identical or different.

10. The polyester film as claimed in claim 9, wherein at least one of the overlayers (A) or (C) comprise a polyester used for the base layer (B).

11. The polyester film as claimed in claim 1, wherein the overlayer (A) has a gloss greater than 120.

12. The polyester film as claimed in claim 1, which has an opacity smaller than 20%.

13. The polyester film as claimed in claim 1, wherein the adhesion between the layers of the film is greater than 0.5 N/25 mm.

14. A process for producing a polyester film as claimed in claim 1, encompassing the steps of
   a) production of a multilayer film by coextrusion,
   b) longitudinal stretching of the film,
   c) coating of the film with the barrier layer (D),
   d) transverse stretching of the coated film, and
   e) heat-setting of the stretched film.

15. Packaging film comprising polyester film as claimed in claim 1.

16. A film according to claim 1, wherein said film exhibits an average roughness, $R_a$, for overlayer (A) of from 10 to 100 nm.

17. A film according to claim 1, wherein said film further comprises recycle formed from said film, present in an amount of from about 10 to 60 % by weight.

18. A biaxially oriented polyester film which has a base layer (B), and has, disposed on this base layer (B) at least one overlayer (A) which has been coated with a barrier layer (D), wherein the base layer (B) comprises poly(m-xylene-adipamide) and polyester, and the barrier layer (D) comprises a film-forming substance and a copolymer of maleic acid and acrylic acid, wherein the only catalysts associated with the film consist of polymerization catalyst(s).

* * * * *